United States Patent [19]

Torre, Jr. et al.

[11] Patent Number: 5,409,645
[45] Date of Patent: Apr. 25, 1995

[54] MOLDING SHAPED ARTICLES

[75] Inventors: Earl R. Torre, Jr., Danielson, Conn.; Michael D. Kavanaugh, North Grafton, Mass.

[73] Assignee: Saint Gobain/Norton Industrial Ceramics Corp., Worcester, Mass.

[21] Appl. No.: 169,105

[22] Filed: Dec. 20, 1993

[51] Int. Cl.$^6$ ............................................. C04B 35/10
[52] U.S. Cl. ...................................... 264/28; 264/56; 264/297.7; 51/309
[58] Field of Search ...................... 264/28, 56, 297.7; 51/309

[56] References Cited

U.S. PATENT DOCUMENTS

| 3,885,005 | 5/1975 | Downing | 264/28 |
| 5,047,181 | 9/1991 | Dcchionero | 264/28 |
| 5,090,968 | 2/1992 | Pellow | 51/309 |
| 5,194,072 | 3/1993 | Rye | 51/309 |
| 5,201,916 | 4/1993 | Berg | 51/309 |

Primary Examiner—James Derrington
Attorney, Agent, or Firm—David Bennett

[57] ABSTRACT

Shaped ceramic articles can be obtained by forcing a ceramic precursor gel into a belt provided with apertures corresponding to the shapes of the desired articles, freezing the gel in the apertures so that they can be removed without losing structural integrity and then removing the frozen articles from the belt and drying and firing them to produce the desired shaped ceramic articles.

11 Claims, 2 Drawing Sheets

MOLDING SHAPED ARTICLES

BACKGROUND TO THE INVENTION

The present invention relates to a process for forming shaped articles with a high degree of flexibility and productivity.

Shaped alumina articles in the form of filamentary abrasive particles made by a seeded sol-gel process have been shown, in U.S. Pat. No. 5,009,676l, to have certain significant advantages over grains having random shapes made by grading crushed larger pieces of abrasive. Methods of forming such shaped grains are disclosed in U.S. Pat. Nos. 5,090,968 and 5,201,916. Other kinds of shaped article made from sol-gel alumina such as discs and fibers and thin sheets have also been described.

A new and very flexible process for the production of shaped alumina articles has now been devised that allows very rapid and efficient production from a gel of a precursor material.

SUMMARY OF THE INVENTION

The process of the invention employs a shaping device comprising an apertured belt with means to introduce a ceramic precursor gel into the apertures in the belt and retain the gel in the apertures while it is subjected to temperatures sufficient to freeze the aqueous component of the gel, means to extract the frozen gel articles from the apertures and means to dry and fire the frozen articles to form shaped ceramic articles that preferably have a density that is at least 95% of the theoretical density of the ceramic and corresponding in general configuration to the apertures in the belt.

While the process of the invention is widely applicable to a variety of shaped ceramic articles, its adaptability to the large-scale and relatively cheap production of identically shaped particles make it very suitable for use in the production of shaped abrasive particles and in the following discussion this will be the primary focus. It is however to be understood that this is for ease of discussion and does not represent any necessary limitation of the scope of the invention.

The gel employed in the process of the invention is referred to as a ceramic precursor gel and by this is intended a finely divided material that, after being subjected to the process of the invention, is in the form of a shaped ceramic article. The precursor may be chemically a precursor, as for example boehmite is a chemical precursor of alpha alumina; a morphological precursor as for example gamma alumina is a morphological precursor of alpha alumina; as well as (or alternatively), physically a precursor in the sense of that a finely divided form of alpha alumina can be formed into a shape and sintered to retain that shape.

Where the gel comprises a physical precursor as the term is used herein, the precursor is in the form of finely divided powder grains that, when sintered together, form a ceramic article, such as an abrasive particle of utility in conventional bonded and coated abrasive applications. While such slips are not properly referred to as "gels", the term is used in this specification to cover these materials for the sake of simplicity. Such materials generally comprise powder grains with an average size of less than about 20 microns, preferably less than about 10 microns and most preferably less than about a micron.

The solids content of the gel of a physical precursor is preferably from about 40 to 65% though higher solids contents of up to about 75% can be used. An organic compound is frequently used along with the finely divided grains in such gels as a suspending agent or perhaps as a temporary binder while the shaped particle is being frozen. This can be any of those generally known for such purposes such as polyethylene glycol, sorbitan esters and the like.

Frozen shaped gels made from physical precursors will typically need to be fired at higher temperatures than those formed from a seeded chemical precursor. For example, whereas particles of a seeded boehmite gel form an essentially fully densified alpha alumina at temperatures below about 1250° C., particles made from alpha alumina gels require a firing temperature of above about 1400° C. for full densification.

The materials that can be made into shaped abrasive grains using the process of the invention include physical precursors such as finely divided particles of known abrasives such as alpha alumina, silicon carbide, alumina/zirconia and CBN. Also included are chemical and/or morphological precursors such as aluminum trihydrate, boehmite, gamma alumina and other transitional aluminas and bauxite. The most useful of the above are typically based on alumina and its physical or chemical precursors and in the specific descriptions that follow the invention is illustrated with specific reference to alumina. It is to be understood however that the invention is not so limited but is capable of being adapted for use with a plurality of different precursor materials.

In one particularly useful embodiment of the invention the shaping device comprises at least two pairs of opposed calendar rolls located in a substantially vertical stack to form vertically associated sets of rolls with diminishing nips between the opposed members of each pair from the top to the bottom of the stack, a pair of flexible belts, one passing over each vertically associated set of rolls and through the nips between each pair, a belt having a plurality of apertures formed therein passing between the nips of the opposed pairs of rolls in the stack, means to drive the flexible belts and the apertured belt in the same essentially downward direction at essentially the same speed and means to control the nip of at least the lowest pair of rolls such that the flexible belts passing over the rolls are in firm contact with the apertured belt.

In the operation of the above device, the gel is fed in to the space between one of the flexible belts and the apertured belt. As the belts travel downward and the space between them becomes narrower, the gel is forced into the apertures in the belt. As the belt array gets closer and closer together, the gel is confined within the apertures in the belt.

After the gel has been conformed to the shape of the apertures the belt travels into a zone where it is subjected to temperatures substantially below the freezing point of the aqueous component of the gel. Where the gel is of a precursor of alpha alumina such as boehmite this is often peptized with an acid such a nitric acid. The temperature to which the gel is subjected should therefore take into account the freezing point of the acid solution rather than merely the water component of the gel. Likewise the presence of other components in the gel can change the temperature at which the aqueous component freezes and the freezing temperature selected should take their presence into account. The object of this freezing is to ensure that the gel is at least partially frozen to the extent that it can be removed from the apertures in the belt without loss of its structural integrity, that is, such that the frozen particle will keep its shape and not stick to other frozen gel particles with which it comes in contact. The removed, shaped and frozen gel particles are then subjected to drying and then to a firing process to convert them to essentially fully densified, (that is, at least 95% of theoretical), particles of alpha alumina.

The arrangement described above could be modified by having the stack arranged in other than a vertical direction, for example the belts could move in a horizontal direction with the nip decreasing in the direction of travel of the belt. Such an orientation would require that the gel be fed to the apertures from only one side. In addition, if the apertured belt is designed to travel in an essentially horizontal direction as proposed above, one of the belts can be replaced by an alternative filling mechanism, such as for example a device that includes a doctor blade, that forces gel into the apertures. In such a design the decreasing nip feature is also unnecessary. If the apertures in the belt do not penetrate through the belt such that they define instead recesses that are open only at one end, then clearly both belts can be dispensed with and the apertures can be filled as the belt travels past a doctor blade device or similar device. Finally, while usually less acceptable in a commercial operation, it is possible to replace the apertured belt with an apertured plate that is subjected to a filling procedure as described above and which is then placed in a cooling device to freeze the gel particles in the apertures in the plate and later separated from the frozen particles which are then dried and fired as described above. In essence this is exactly the same process as is described above but operated in a non-continuous manner. It is understood that references to the use of an "apertured belt" are intended to cover the use of such apertured plates in such a non-continuous operation.

Shaped articles that have been fired to form abrasive grains may be incorporated into a bonded abrasive such as a grinding wheel, or a coated abrasive such as a grinding disc or belt.

DETAILED DESCRIPTION OF THE INVENTION

The design of the apertured belt is an important feature of the process of this invention. The apertures can have any desired shape including discs, plates or even continuous grooves so as to form filaments when the gel is frozen and fired. However the following discussion will focus on shaped articles in the form of abrasive particles. These are found to be most useful when they have a generally cylindrical configuration. Such particles therefore have an "aspect ratio", which is defined as being the length of the cylinder divided by the greatest dimension of the cross-section perpendicular to the axis of the cylinder. The cylinder cross-section obtained by the use of such an apertured belt can be rectangular, such as square, but the shrinkage that occurs on drying and firing leads to a particle shape that is perhaps closer to round, (or oval in the case of a rectangular shape that is not square). The apertures may however have other configurations such as pyramidal, thin discs or plates and the like. Often a shape with a trapezoidal cross-section is desirable as this will make filling of the aperture and extraction of the frozen gel particle easier.

The process of the invention is particularly adapted to the efficient and large scale production of such particles because, by aligning the apertures in which the particles are formed, it is possible to have apertures over a very large part of the surface area of the apertured belt without seriously diminishing its strength. Examples of such configurations are shown in FIGS. 3 and 4 discussed below.

The apertured belt is usually driven and this implies that the predominant stress on the belt is in the longitudinal direction, that is, it will tend to be stretched. If the apertures are aligned in the direction of movement of the belt, this tendency to stretch will not lead to significant distortion of the cross-section of the particle. This therefore is a preferred feature of apertured belts for use in the process of the invention. Such a shape has the additional advantage that it allows more of the material from which the belt is made to be oriented lengthwise and this contributes to a optimizing the strength of the belt in that direction.

Where the apertured belt is in contact with flexible belts during the gel-introduction phase of the process, these should preferably be made from a moisture resistant material to ensure it is not affected by the water content of the gel. Since they are also driven, it is preferred that the belts be relatively inextensible. They should preferably also be substantially smooth so as to avoid the gel penetrating the material of the belt and making separation from the apertured belt difficult. Many alumina gels have an acid pH, especially if they have been peptized by addition of an acid, and therefore the preferred belts should have substantial corrosion resistance. Finally the most effective materials are those which allow ready cooling of the gel in the apertures. The preferred materials meeting these many criteria is stainless steel though other materials such as chrome-plated nickel, polytetrafluoroethylene, copolymers comprising a fluorinated ethylene monomer component and polypropylene could be substituted in appropriate circumstances.

Since many of the same criteria apply to the choice of the material from which the apertured belt is made, it is often appropriate to select the same material. However the conditions to which the apertured belt is exposed during the process usually make a metal the preferred choice.

When the gel is fed into the space between the apertured belt and a second belt, there is a tendency for the gel to spread and significant amounts can be lost from the sides of the device, particularly at the lower end of the stack of rolls. To avoid this occurring, various flow restrictors may be used to prevent excessive sideways flow of the gel. One such restrictor comprises providing terminal flanges on one of each pair of rolls that extend towards the other roll of the pair and in close tolerance with the edges thereof. Where a stack of rolls is used it will usually only be necessary to supply such flanges only for the lower pair or pairs of rolls.

The manner of freezing the gel is not critical provided that it can be completed to the extent necessary to be able to remove and handle the particles within a reasonably short time, particularly where the process is intended to operate continuously.

Where the apertures in the belt are open on both sides of the belt, the chilling can advantageously be done by means that include a blast of cold air preferably as the last stage of a cooling operation begun as the gel is conformed to the mold shape. Alternatively the process can be a conventional flash freezing process, passage through a cryogenic chamber or perhaps the result of a fine spray of a liquified gas such as nitrogen or contact with "dry ice", (solid carbon dioxide).

It is often advantageous that the apertured belt be itself chilled before the gel is inserted into the apertures such that the freezing process begins upon contact with the aperture. Care must however be taken to ensure that the belt temperature is not so low that the complete filling of the apertures is impeded.

Removal of the frozen particles from the belt can be done by blowing the particles from the apertures or by other means such as by flexing the belt, for example by passing it over a relatively small curvature edge. This is often enough to cause the particles to "pop out" of the apertures without any further encouragement. The edge may be a small diameter roll or perhaps an actual knife edge, advantageously with an aperture through which a blast of a suitable gas could be used to aid in evicting the particles from the belt apertures where these pass completely through the belt. Removal of the particles from the belt is often rendered easier by applying a release coating to the inside surface of the apertures. Such release coatings are well known in the art and include permanent or temporary sprayed-on coatings of materials such as polytetrafluoroethylene and similar fluoropolymers, silicones, stearates and the like.

The gel fed into the apertures in the apertured belt as described above preferably has as high a solids content as is possible consistent with the requirement that it needs to be sufficiently flowable to fill the apertures in the apertured belt. With a gel of boehmite this implies a solids content of about 20 to about 75% and preferably from about 40 to 55% by weight. Incorporation of certain other components such as soluble salts, (for example magnesium nitrate), can make the viscosity higher and in such cases the solids content should be in the lower end of the above ranges. Consistent with this flowability requirement however there is a desire to have as little water to remove as possible and this favors the use of higher solids contents.

In the case of alumina, the gel is preferably a gel of an alpha alumina precursor such as boehmite but it is also possible to use, for example a gel of gamma alumina or one of the other intermediate forms of aluminum oxide in hydrated form or without associated water molecules, that convert to alpha alumina upon heating. Such an alpha alumina precursor gel can also comprise other components that lower the temperature at which alpha alumina is formed. These include nucleating agents such as alpha alumina, ferric oxide, chromium oxide and a number of other mixed oxides with crystal lattice parameters that are sufficiently similar to allow them to provide nucleating sites for the formation of alpha alumina from the transitional forms and to reduce the temperature at which this transition occurs. Such agents often lead to the formation of extremely fine and uniform crystalline structures with very desirable properties in the abrasive field. Other components that have been found to be desirable in certain circumstances for the production of aluminous abrasive particles include magnesia, titania, zirconia, yttria and rare earth metal oxides. Such additives often act as crystal growth limiters or boundary phase modifiers.

It is also possible to use, instead of a chemical or morphological precursor of alpha alumina, a slip of finely divided alpha alumina itself together with an organic compound that will maintain it in suspension and act as a temporary binder while the particle is being fired to essentially full densification. In such cases it is often possible to include in the suspension materials that will form a separate phase upon firing or that can act as an aid in maintaining the structural integrity of the shaped particles either during drying and firing, or after firing. Such materials may be present as impurities. If for example the precursor is finely divided bauxite, there will be a small proportion of vitreous material present that will form a second phase after the powder grains are sintered together to form the shaped particle.

DESCRIPTION OF SPECIFIC EMBODIMENTS OF THE INVENTION

The invention is now described with specific reference to the drawings. It is to be understood however that this is for the purposes of illustration only and implies no essential limitation of the scope of the invention described and claimed herein.

Figure 1:
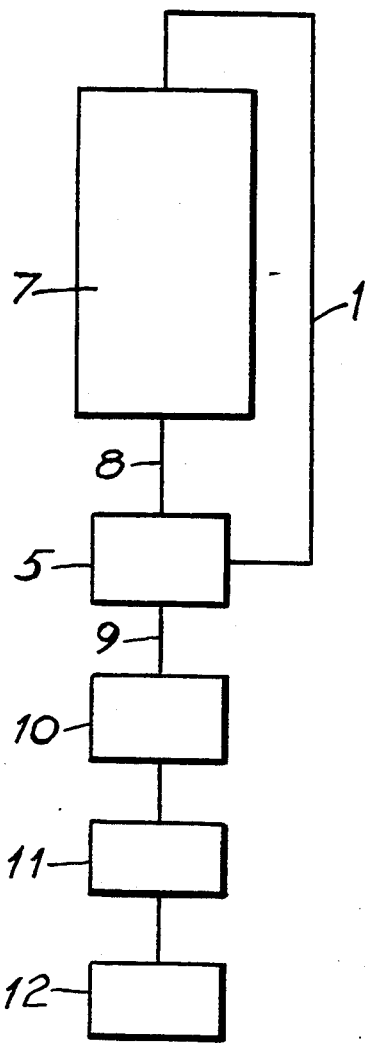
FIG. 1 is a schematic drawing of a process for producing shaped abrasive grits.
Figure 2:
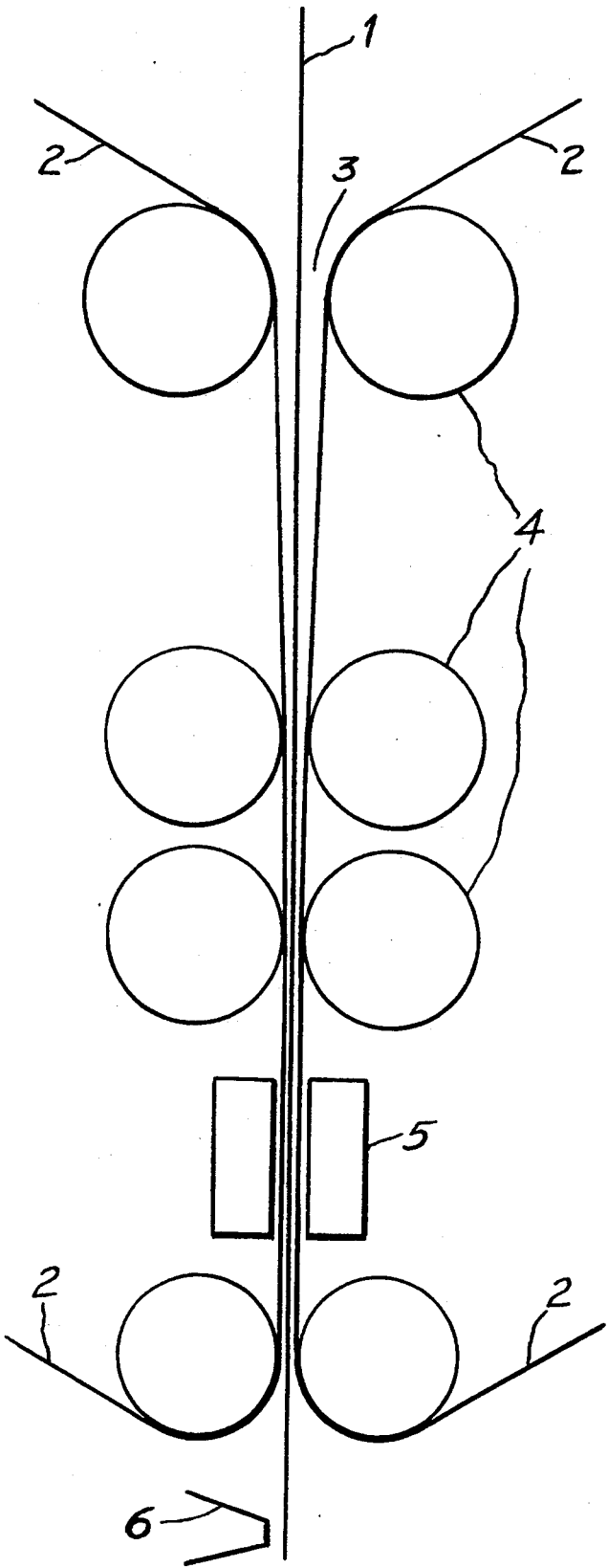
FIG. 2 is a detailed schematic representation of the molding stage of the device of the invention.
Figure 3:
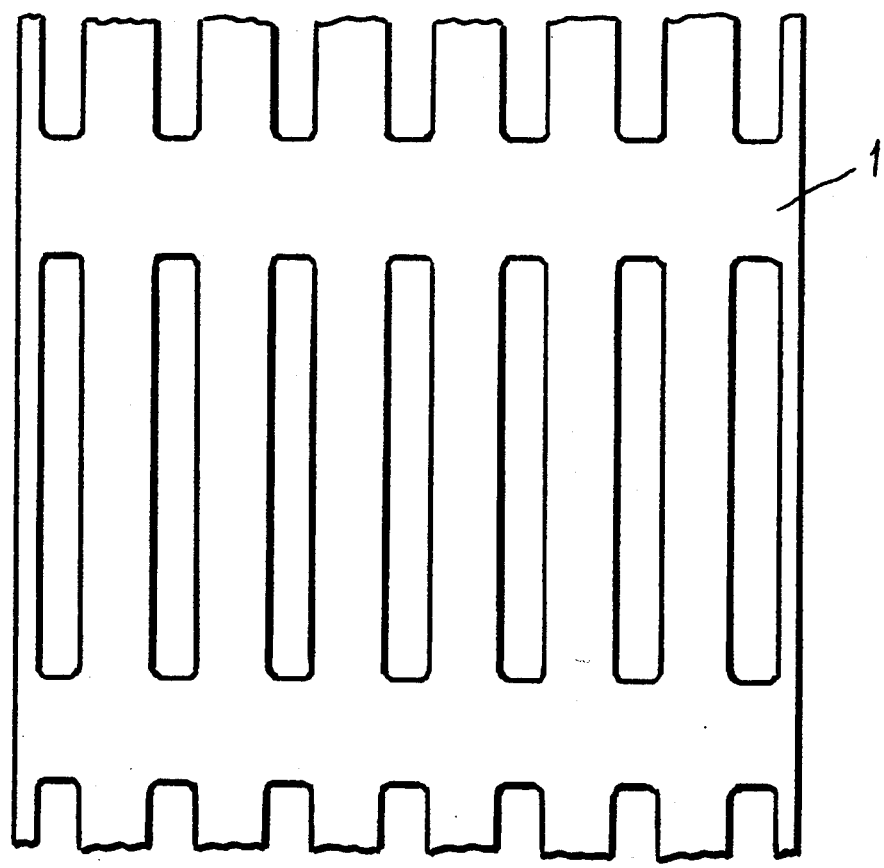
FIGS. 3 and 4 are close-up illustrations of a portion of the surface of belts that may be used in the process of the invention.
Figure 4:
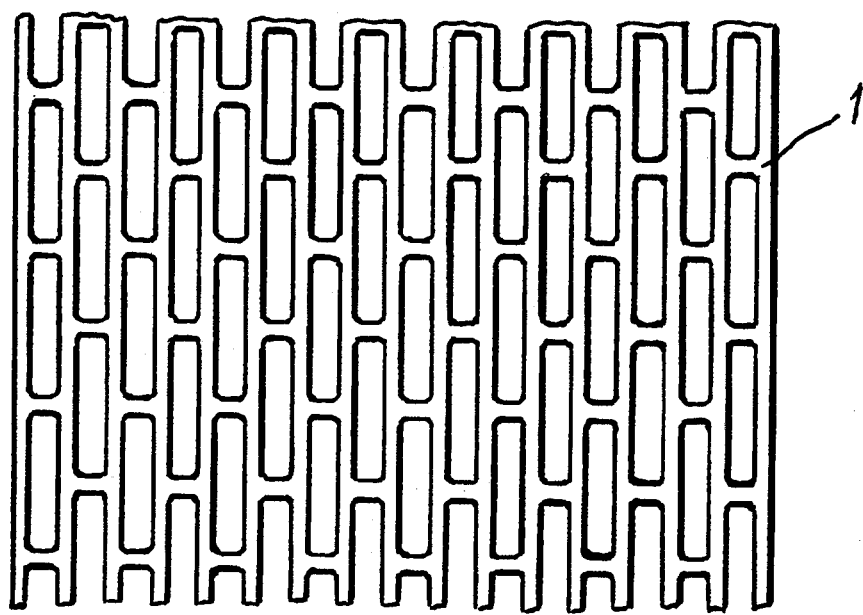

Referring first of all to FIG. 1, the process comprises feeding an apertured molding belt, 1, of the kind described in more detail in FIGS. 3 and 4 into a molding stage, 7, of the kind described in detail with respect to FIG. 2, in which a boehmite gel is inserted into the apertures in the belt. Thereafter the apertured belt with the apertures filled with boehmite gel passes to a rapid freezing stage, 5. In this freezing stage the shaped gel particles formed in the apertures of the belt in stage 7 and carried to the next stage in the filled apertured belt, 8, are rapidly frozen and separated as a stream of individual shaped particles, 9, while the belt, 1, is recycled through the molding stage after being cleaned.

The stream of frozen gel particles, 9, is subjected to a drying stage, 10, before being forwarded to a firing stage, 11, in which the particles are converted to the final alpha alumina form, before being graded and packed in a final stage, 12.

Referring now to FIG. 2 for a more complete description of the molding stage, an apertured belt, 1, is fed between two flexible stainless steel belts, 2, and into the nip of a first pair of a stack of three pairs of calendar rolls, 4, with a gradually decreasing nip from the top to the bottom of the stack. A gel is fed into the gap, 3, between the apertured belt and one of the flexible stainless steel belts. At least the lower pair of rolls in the stack, 4, is chilled. As a result of the gradually decreasing nip the boehmite gel is forced in to the apertures until they are completely filled.

Upon leaving the nip of the bottom pair of the stack of calendar rolls, the filled apertured belt is passed into a freezing zone, 5, where the gel is rapidly frozen to the point that the frozen gel particles can be handled without sticking to one another and forming intractable clumps. These are then forced from the apertures using a jet of cold air and collected for drying and firing before being graded and packed. The empty apertured belt is then cleaned, for example using brushes, and recycled to the molding stage.

The process has been described using a jet of cold air to separate the frozen particles but it will be appreciated that the jet could, if cold and intense enough be adequate in and of itself to accomplish the freezing and separating operations in a single stage. This is in fact a preferred manner of operating the process that forms part of this invention.

The gel has been described as being fed into the gap between a flexible stainless steel belt and one side of the apertured belt. It will be understood however that if the apertures are open on both sides of the belt, it may be more efficient to feed the gel to both sides of the apertured belt, especially if the gel has a high viscosity as a result of a high solids content and a low temperature.

Other variations of the device and process described can be devised without departing from the essential concept of the invention and it is understood that all such variations are included within the invention described and claimed herein.

What is claimed is:

1. A process for the production of shaped ceramic articles which comprises forcing a ceramic precursor gel into contact with an apertured belt such that the gel fully occupies at least some of the apertures in the belt by passing the apertured belt between a pair of flexible belts and between the nip of a stack of calendar rolls with decreasing nip between the pairs of rolls and feeding the gel into the space between at least one of the flexible belts and the apertured belt before the belt enters the nip of the first pair of rolls in the stack; freezing the gel in the apertures to the point that they can be removed and upon removal can be manipulated without losing structural integrity; separating the gel from the belt in the form of frozen shaped articles; and then drying and firing the frozen gel at a temperature sufficiently high to form shaped ceramic articles.

2. A process according to claim 1 in which the precursor gel is a boehmite gel with a solids content of from about 20 to about 65% by weight.

3. A process according to claim 1 in which the apertures in the belt are such as to produce particles with a substantially uniform cross sectional shape.

4. A process according to claim 1 in which the apertures in the belt are open on both sides of the belt and gel is forced into the apertures from both sides.

5. A process according to claim 1 in which the gel is frozen by a stream of supercooled gas at a temperature of from about 0° C. to about −200° C.

6. A process according to claim 1 in which the particles are ejected from the belt by a procedure that includes flexing of the belt.

7. A process according to claim 1 in which the flexible belts are stainless steel belts.

8. A process according to claim 1 in which the apertured belt is chilled before contact with the gel to a temperature below that of the gel but above the temperature that would prevent the filling of the apertures.

9. A process according to claim 1 for the production of alumina abrasive grits in which the ceramic precursor gel is a boehmite gel and the frozen gel particles are fired at a temperature sufficiently high to form shaped abrasive alumina particles with a density of at least 95% of the theoretical density.

10. A process according to claim 9 in which the boehmite gel is seeded with a nucleating agent in an amount effective to reduce the temperature of transition to the alpha alumina phase.

11. A process according to claim 9 in which the gel contains crystal growth limiting additives in an amount effective to limit the crystal size of the alpha alumina in the abrasive particles.

* * * * *